May 1, 1962 E. R. LEWIS, JR 3,032,351
PROTECTIVE VENTILATED CLOSURE FOR VEHICLE WINDOWS
Filed Jan. 16, 1961

INVENTOR.
EDGAR R. LEWIS, JR.
BY
ATTORNEY

United States Patent Office 3,032,351
Patented May 1, 1962

3,032,351
PROTECTIVE VENTILATED CLOSURE FOR
VEHICLE WINDOWS
Edgar R. Lewis, Jr., 7131 SW. 5th Terrace, Miami, Fla.
Filed Jan. 16, 1961, Ser. No. 82,775
1 Claim. (Cl. 280—150)

This invention relates to a closure device for detachable insertion into a window opening of motor vehicles and to constitute a barrier against any unauthorized entry through the window opening.

The invention contemplates a barrier that is proportioned to be disposed in the window opening and held against displacement by the upward movement of the window glass whereby the device at its upper end has seating engagement into the upper glass groove while the upper edge of the glass engages and seats into a channel carried by the device at its lower end.

The invention further contemplates an open frame that is spanned both longitudinally and vertically by a relatively wide mesh screen, forming a barrier to prevent pets from escaping from the vehicle and to provide ventilation for the interior of the vehicle.

The frame of this invention may also provide a mounting means for various of closure devices such as signs, slatted closure devices, insect screening or fixed bars that present both a barrier and a ventilating means for the interior of the vehicle.

Novel features of construction and operation of the device will be more clearly apparent during the course of the following description, reference being had to the accompanying drawings, wherein has been illustrated a preferred form of the device and wherein like characters of reference are employed to denote like parts throughout the several figures.

Figure 1:
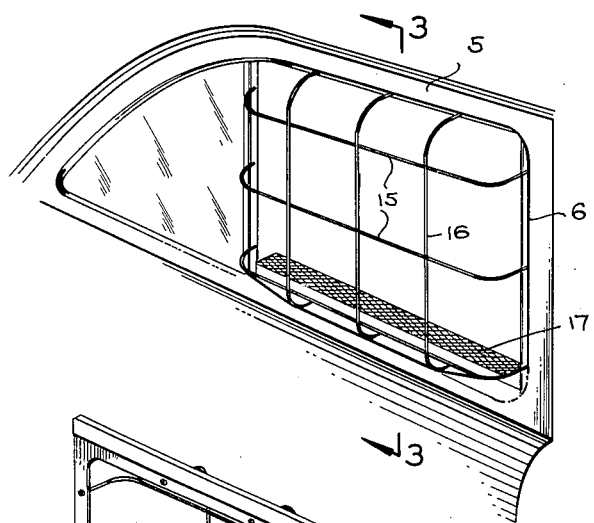
Figure 2:
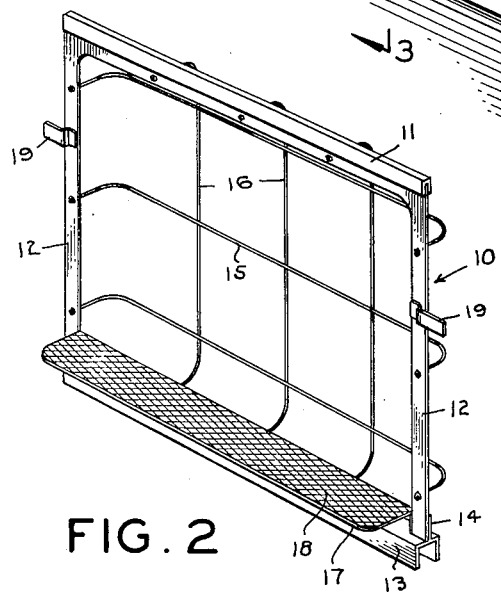
Figure 3:
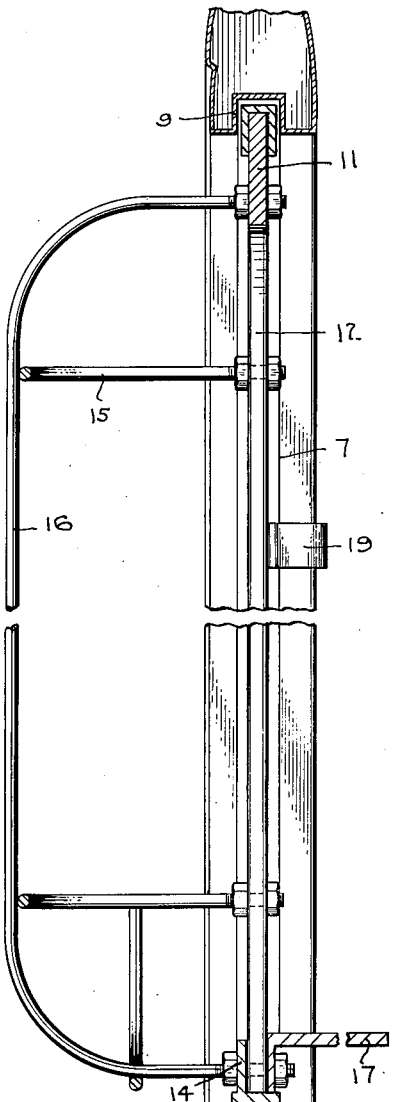
Figure 4:
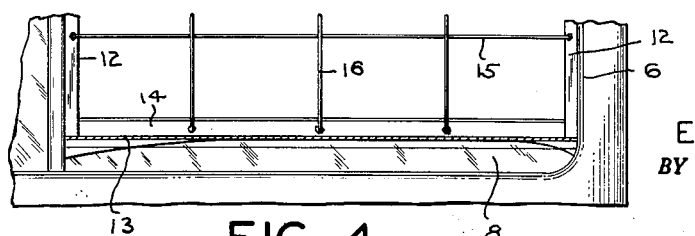

In the drawings:
FIGURE 1 is a perspective view from the exterior of a vehicle, showing the invention in use,
FIGURE 2 is a perspective view of the device taken from the inner side,
FIGURE 3 is an enlarged vertical section, taken on line 3—3 of FIGURE 1 and,
FIGURE 4 is a fragmentary longitudinal section through a lower channel rail showing the window glass engaged therein.

Referring specifically to the drawings, the numeral 5 designates a fragmentary portion of a motor vehicle having a window opening 6. Movable in a conventional manner in grooves 7, is a glass closure panel 8. The panel 8 at its upper end engages the usual upper groove 9, all customary in motor vehicles. The panel 8 is narmally contoured upon its upper edge to conform to the upper contour of the window opening.

Disposed in the window opening 6, is a rigid and preferably metallic frame, indicated as a whole by the numeral 10. The frame embodies an upper rail 11, a pair of vertical and parallel bars 12 and a lower channel rail 13. The vertical bars 12 are riveted, welded or otherwise connected to the ends of the rail 11. The channel rail 13 is provided with an upstanding flange 14 that is connected to the lower ends of the bars 12 as by riveting or welding. The channel of the rail 13 is downwardly opening, for a purpose to be presently described. While the rails 11 and 13 have been shown straight, it may be found desirable to form them longitudinally bowed.

Fixedly connected to the several frame members to project outwardly of the window opening, is a barrier, including longitudinal and vertical relatively stiff wires 15 and 16 forming a relatively wide mesh screen, the openings in the screen being such as to prevent the insertion of the hand of an unauthorized person who may seek to gain access to the interior of the vehicle. While a wire barrier has been illustrated, it will be apparent that other forms of closure devices may be substituted, such as slotted closures, insect screening, fixed bars or sign devices all having in mind the ventilation of the interior of the vehicle. The device illustrated is primarily for use as a barrier to prevent pets from jumping out of the window yet, affording adequate ventilation. For use as a dog barrier, the frame at its lower end is provided with a foot rest 17 that extends inwardly of the window opening since dogs customarily ride with their paws on the window sill and, since the barrier projects outwardly beyond the window opening, it permits the animal to extend his head outwardly of the vehicle. The upper surface of the foot rest 17 may be covered with a strip of roughened material or the surface may be knurled as at 18.

To facilitate the mounting of the frame into the window opening, tabs 19 are fixed to each of the bars 12 to limit the engagement of the frame and to align the upper rail 11 with the upper groove 9 and to align the channel rail 13 with the glass panel 8.

In the use of the device, the panel 8 is first lowered and the frame 10 engaged into the opening 6 to the point where the tabs 19 engage the inner trim of the opening. The glass is then raised, causing its upper edge to engage in the channel of the rail 13, moving the frame upward and seating the upper rail 11 into the upper groove 9 to thus fixedly clamp the device into the window opening against unauthorized removal. The channel is deep enough to receive a substantial length of the glass since, as is well known, the upper edge of the glass in the major number of vehicles is longitudinally curved. If found desirable, the barrier wire 15 and 16 may be omitted and the opening of the frame covered by other suitable ventilated covers.

It will be apparent from the foregoing that a very simple closure device has been provided that is quickly and easily mounted in a window opening and that constitutes a protective barrier that furnishes the desired ventilation for the vehicle. The device is cheap to manufacture, is strong, durable and highly effective for the purposes stated.

It is to be understood that the invention is not limited to the precise construction shown, but that changes are contemplated as readily fall within the spirit of the invention as shall be determined by the scope of the subjoined claim.

Having described my invention, what I claim as new and desire to secure by Letters Patent is:

A protective ventilated closure to be fittingly engaged into a door window opening of motor vehicles when the opening is uncovered, the window opening being bounded by glass receiving grooves across the top and along both sides to receive a slidable glass panel, the closure comprising an open rectangular frame including a channel head rail, a base rail and connecting side bars, the base rail being a downwardly opening channel that is disposed in overlying arrangement with the upper marginal edge of the glass panel, the upper rail having a seating engagement within said top groove of the window opening and clamped into such groove when the glass panel is partially elevated to engage within the channel of the base rail to force the frame upwardly, the base rail being provided with an upstanding flange that is connected to the lower ends of the bars, a foot rest upon the inner side of the frame that has connection with the bars at their lower ends, the foot rest being co-extensive with the base rail and having a flat upper surface that is serrated, the said foot rest projecting inwardly from the frame to extend inwardly of the vehicle beyond the plane of the door frame, a cage device including longitudinal and vertical spaced apart wires that have their terminal ends connected with the closure frame, the cage projecting forwardly of the latter frame to extend outwardly beyond the plane of the door frame, each of the bars having fixed Z-shaped brackets that are proportioned to have abutting engagement against the inner side of the door window opening at either side whereby to limit the positioning of the frame into the door window opening for aligning the upper end lower rails with respect to the upper groove and the marginal edge of the glass panel.

References Cited in the file of this patent

UNITED STATES PATENTS

| | | |
|---|---|---|
| 1,349,521 | Mahoney | Aug. 10, 1920 |
| 1,507,478 | Gray | Sept. 2, 1924 |
| 1,608,785 | Evans | Nov. 30, 1926 |
| 2,568,800 | Galla | Sept. 25, 1951 |
| 2,690,797 | Eriksen | Oct. 5, 1954 |
| 2,864,648 | Bland | Dec. 16, 1958 |